United States Patent [19]

Johnson

[11] Patent Number: 4,775,323

[45] Date of Patent: Oct. 4, 1988

[54] HORNED ANIMAL HEAD MANNIKIN

[75] Inventor: Brian L. Johnson, Spring Green, Wis.

[73] Assignee: The American Institute of Taxidermy, Inc., Janesville, Wis.

[21] Appl. No.: 142,563

[22] Filed: Jan. 11, 1988

[51] Int. Cl.[4] .............................................. G09B 23/36
[52] U.S. Cl. ..................................... 434/296; 428/16; 428/542.4
[58] Field of Search ....................... 434/296, 295, 297; 428/16, 542.2, 542.4

[56] References Cited

U.S. PATENT DOCUMENTS

| | | | |
|---|---|---|---|
| 453,008 | 5/1891 | Kaempfer | 428/16 X |
| 2,003,896 | 6/1935 | Menger | 434/296 |
| 2,831,271 | 4/1958 | Stitt | 434/296 |
| 4,432,919 | 2/1984 | Rinehart | 434/296 X |
| 4,464,440 | 8/1984 | Dotzman | 434/296 X |
| 4,596,683 | 6/1986 | Powell | 264/46.4 |
| 4,717,626 | 1/1988 | Badger | 434/296 X |

Primary Examiner—William H. Grieb
Attorney, Agent, or Firm—Howard M. Herriot

[57] ABSTRACT

Disclosed is a horned animal mannikin having a recessed flat skull surface between upstanding front and rear walls, with a domed ridge upstanding from the flat surface and extending from the front wall to the rear wall, being centered longitudinally on the mannikin and the flat surface. The convex top surface of the ridge has a curvature approximately matching the curvature of the underside concavity of the skull plate of a horned animal. The domed ridge is widest and highest at about its midportion curving to lesser widths and lesser heights at its ends at the upstanding walls. A fastening plate is disposed under the ridge.

9 Claims, 5 Drawing Sheets

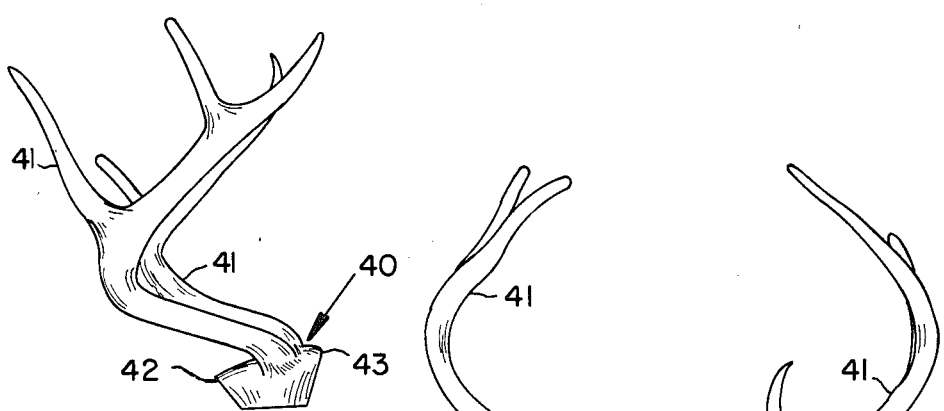
FIG. 8
FIG. 7
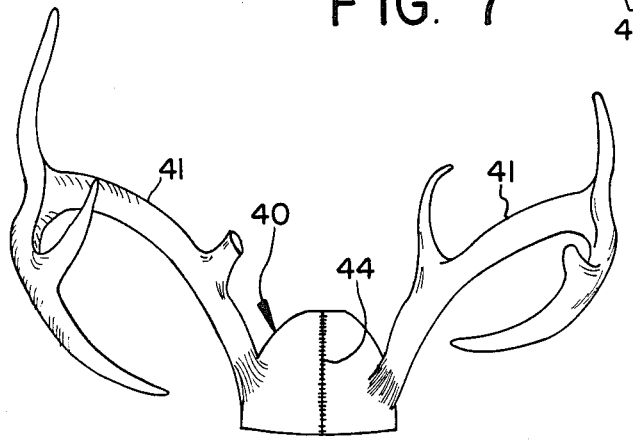
FIG. 9
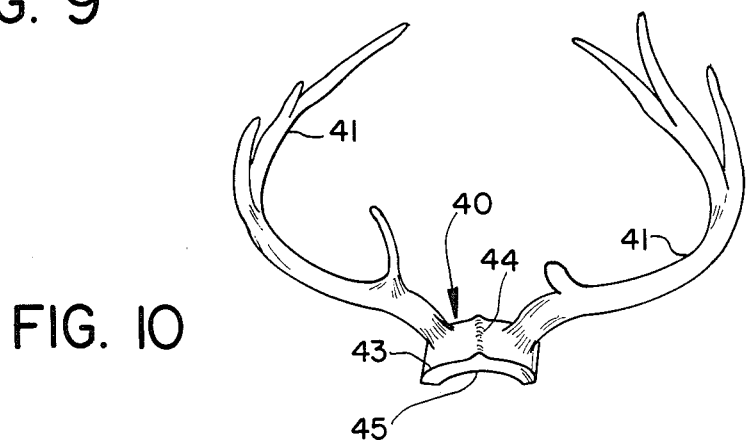
FIG. 10

HORNED ANIMAL HEAD MANNIKIN

BACKGROUND OF THE INVENTION

Taxidermists, in the preparation of head-and-neck trophy mounts of horned (antlered) animals such as deer, elk, antelope, moose, goats, cattle, sheep and the like, often experience difficulty in securing the antlers to the mannikin in the proper position thereon. This is because the prior art mannikins have a flat surface skull area to which the animal's skull plate, when removed from the animal, is secured. However, the animal's skull plate is not flat, but is curved. The underside of the skull plate is concave, being curved like a dome ceiling from side to side and also from front to back. Accordingly, it is most difficult to position the curved skull plate correctly on the flat surface, and the common practice has been to use wedge pieces, or excelsior, or modeling clay, as a build-up to better accomodate the concavity in the skull plate, to try to hold and fasten the skull plate to the flat surface in correct position. It is a time consuming process often resulting in rotating the skull plate too far forward or too far back, or too far right or too far left. And often the antlers are secured in improper position, tipped too far forwardly or rearwardly, or tipped too far to the right or left.

Flat skulled prior art mannikins are shown, e.g., in U.S. Pat. Nos. 2,831,271, 4,432,919, and 4,596,683.

SUMMARY OF THE INVENTION

This invention provides an improved mannikin for greatly simplifying the securing of the antlers to the mannikin in proper position. The improved mannikin has a ridge (hump or dome) upstanding from the flat skull surface of the mannikin, the ridge being a convex dome with a curvature approximately matching the curvature of the concave undersurface of the animal's skull plate, making the correct positioning and the securing of the antlers a much quicker and easier task.

A summary description is set forth in the Abstract of the Disclosure and reference is to be had thereto.

An object of the invention is to provide, for a horned animal head mannikin, a skull plate receiving ridge of frusto ellipsoidal shape curved front to back and also side to side, having its curvature approximately matching the curvature of the underside concavity of a horn skull plate taken from the animal.

Another object is to provide, in such a mannikin, longitudinal center line indicia to aid in correctly positioning the animal's skull plate on the ridge.

A further object is to provide, in such a mannikin, an upstanding back wall at the rear end of the ridge and an upstanding front wall at the front end of the ridge.

BRIEF DESCRIPTION OF THE DRAWINGS

FIG. 7 is a front view of an antlers-and-skull plate piece removed from a deer;

FIG. 8 is a right side view thereof;

FIG. 9 is a top plan view thereof;

FIG. 10 is a rear view thereof;

DETAILED DESCRIPTION

Figure 1:
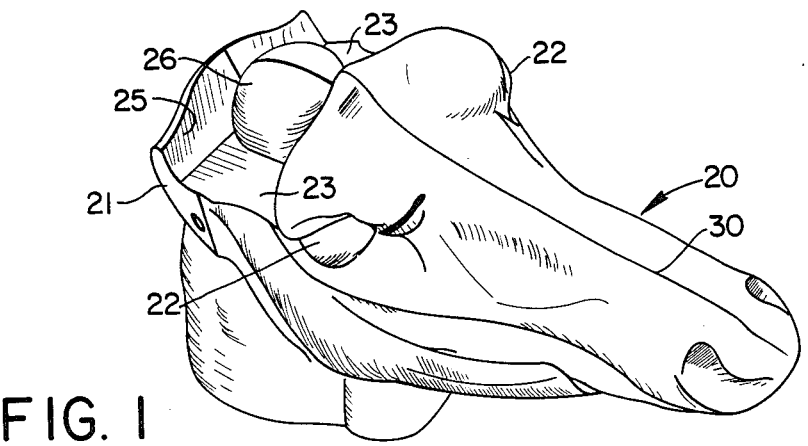
FIG. 1 is a perspective view of a portion of a deer head mannikin embodying the invention.
Figure 2:
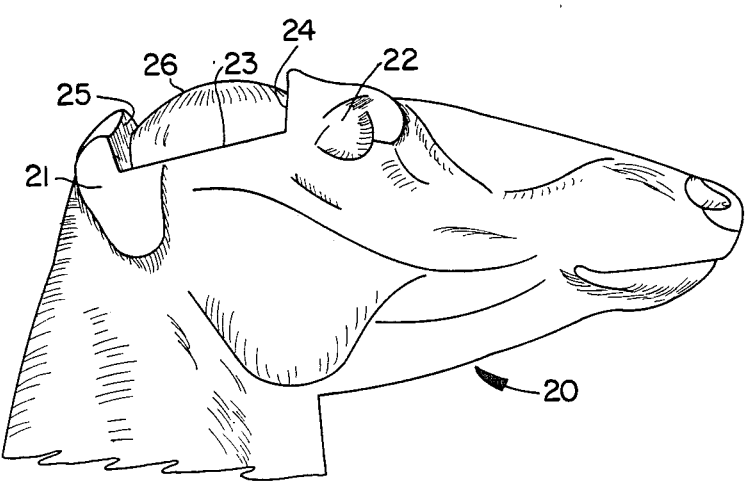
FIG. 2 is a right side view thereof.
Figure 3:
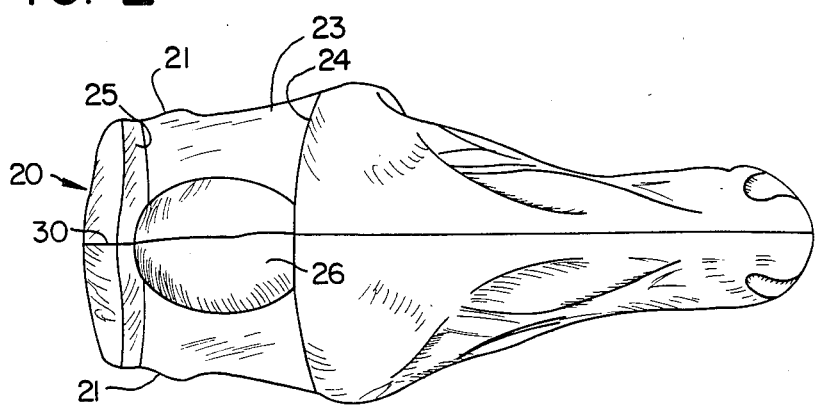
FIG. 3 is a top plan view thereof.
Figure 4:
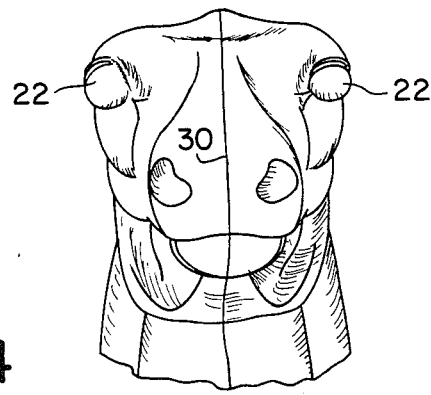
FIG. 4 is a front view thereof.
Figure 5:
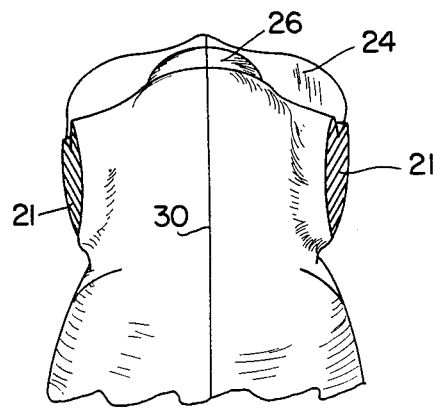
FIG. 5 is a rear view thereof.
Figure 6:
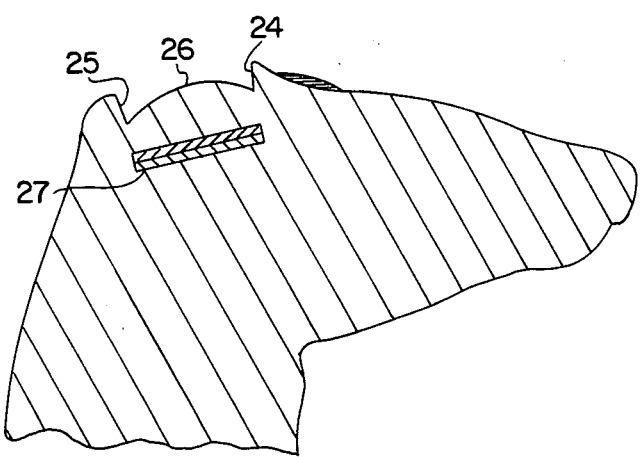
FIG. 6 is a longitudinal center sectional view thereof.

Referring to the drawing, in FIGS. 1 through 6 there is shown a deer head mannikin 20, with lower neck portion removed. The mannikin may be formed, for example, of light weight polyurethane material, by molding it in a two part, right side-and-left side cavity mold, leaving a mold parting center line 30 thereon. Line 30 may serve as an alignment guide or indicia as explained hereinafter. The mannikin has correct deer head anatomical features and mannikin elements located correctly thereabout, including ear mounting surfaces 21 and eye formations 22. Forwardly of the ear mounting surfaces 21 and rearwardly of the eye formation 22, in the skull zone of the mannikin there is a recess having a flat bottom surface 23 extending from upstanding front wall 24 to upstanding rear wall 25. Projecting up from surface 23 is a dome-topped ridge 26 of frusto ellipsoidal shape with its convex top surface curving as shown from front to back and from side to side, with a curvature approximately matching the curvature of the underside concavity of a deer skull plate. Under the ridge 26 is a fastening plate 27, e.g. a small sheet of plywood, suitable for receiving therein or therethrough the threads of fasteners, such as screws (not shown) which may be used to fasten the skull plate to the ridge 26. Plate 27 may conviently be insert molded into the mannikin 20 if the mannikin is formed by molding.

In FIGS. 7 through 10, there is shown the one-piece antlers-and-skull plate 40, which carries antlers 41. Skull plate 40 is removed from a deer by cutting the bone laterally across behind the eye area of the deer and just forward of the base of antlers 41, thereby forming front edge 42, and by also cutting laterally across forwardly of the rear portion of the ear area of the deer thereby forming rear edge 43; and by also cutting the bone two times longitudinally, far enough out from each side of the top center ridge 44 to include the base of each of antlers 41, so that the antlers remain on the skull plate to form the one piece antlers-and-skull plate as shown. The underside cavity 45 is like a domed ceiling, curved from front to back and from side to side as shown in the drawing.

Figure 11:
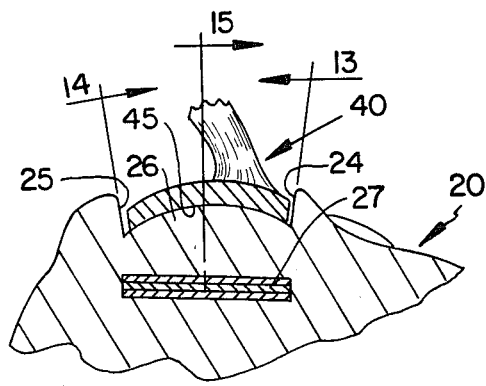
FIG. 11 is a longitudinal center sectional view of the skull portion of the mannikin with the antler-and-skull plate positioned correctly thereon ready for fastening thereto.
Figure 16:
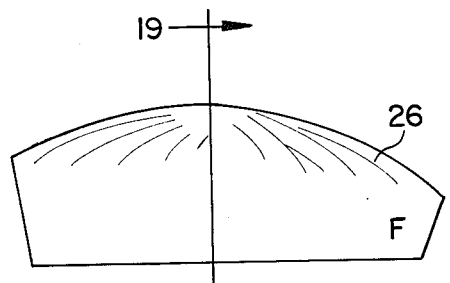
FIG. 16 is a right side view of a separate ridge piece as in the second embodiment of the invention.
Figure 18:
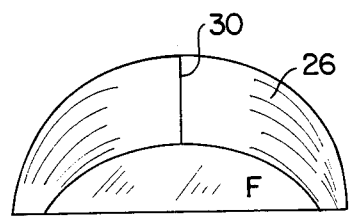
FIG. 18 is a front view thereof.
Figure 17:
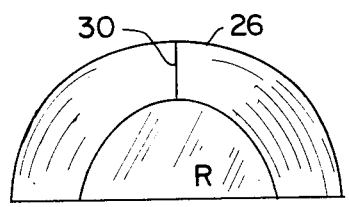
FIG. 17 is a rear view thereof.
Figure 19:
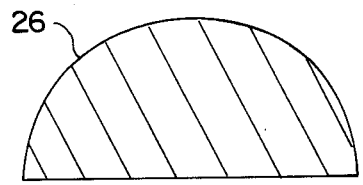
FIG. 19 is a sectional view taken on line 19 of FIG. 16.
Figure 12:
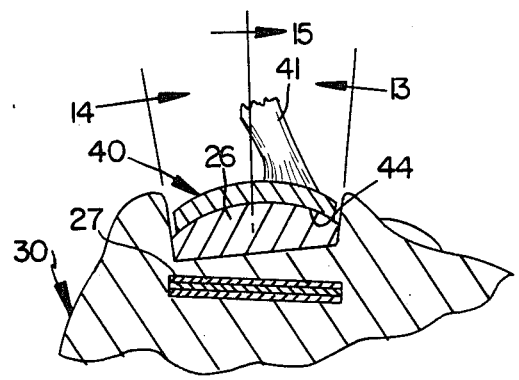
FIG. 12 is a view, corresponding to that in FIG. 11, of a second embodiment of the invention.
Figure 13:
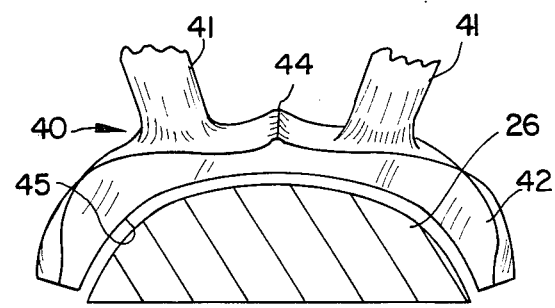
FIG. 13 is a sectional view taken on line 13 of either of FIGS. 11 or 12.
Figure 14:
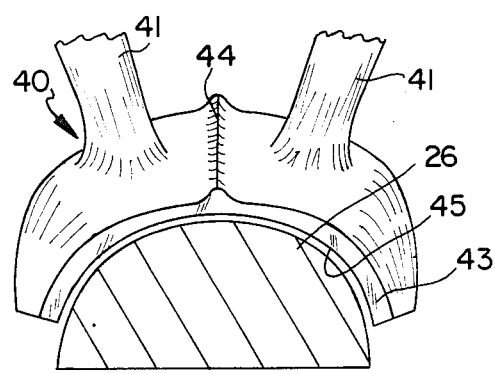
FIG. 14 is a sectional view taken on line 14 of either of FIGS. 11 or 12.
Figure 15:
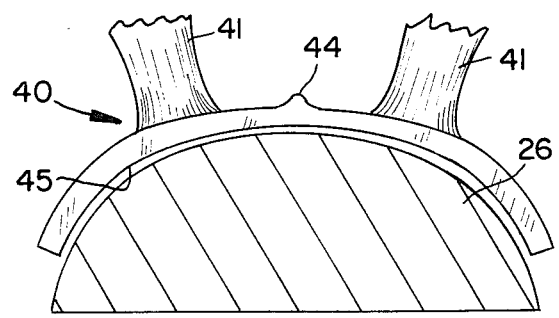
FIG. 15 is a sectional view taken on line 15 of either of FIGS. 11 or 12.

FIG. 11 shows the preferred embodiment of the invention wherein ridge 26 is integral with mannikin 20, as e.g., being molded therewith as a part thereof. FIG. 12, and FIGS. 16 through 19, show a second embodiment of the invention wherein ridge 26 is a separate piece which may be cemented, wedged, screwed or otherwise fastened to the mannikin.

The dome-like ridge 26 is slightly longer than it is wide, having its greatest width at about its midportion with lesser widths at its ends where it meets walls 24 and 25. The ridge also has its greatest height at about its midportion, with lesser heights at its ends.

In either embodiment, the skull plate of the deer may easily be correctly positioned by placing the underside concavity 45 onto the convex surface of ridge 26 and rotating it to proper position. The skull plate may be rotated sidewise to align the top center ridge 44 of the skull plate with the centerline 30 indicia of mannikin 20 just forward of and just rearward of the skull plate. Proper front-to-rear position is accomplished by rotating the skull plate forwardly to rest against or be very close to front wall 24 of the mannikin. The skull plate thus placed in proper position may then be fastened to the mannikin in this correct position. The fastening may be done by cementing the underside of the skull plate to ridge 26 with suitable glue or other cement or adhesive, or by using screw fasteners (not shown) to extend through pre-drilled holes (not shown) in the skull plate, with the threads of the screw fasteners reaching into or through fastener plate 27.

When the antlers have been thus attached in correct position on the mannikin, then the skin of the head, face and neck of the animal is fitted over the mannikin and attached thereto in known manner in the preparation of trophy mounts.

What is claimed is:

1. A horned animal head mannikin having a recess in the skull zone thereof, a convex horned skull plate receiving ridge upstanding from and extending longitudinally thereon, the curvature of the top surface of said ridge approximatly matching the curvature of the underside concavity of the skull plate of the animal.

2. The invention of claim 1 wherein the mannikin has longitudinal center line indicia thereon at the forward end of the ridge.

3. The invention of claim 1 wherein the mannikin has longitudinal center line indicia thereon at the rearward end of the ridge.

4. The invention of claim 1 wherein the mannikin has longitudinal center line indicia at the forward and rearward ends of the ridge.

5. The invention of claim 1 wherein the mannikin has longitudinal center line indicia just forward of the forward end of the ridge, and just rearward of the rear end of the ridge.

6. The invention of claim 1 wherein the mannikin has an upstanding front wall thereacross at the front end of the ridge; and a longitudinal center line indicia on said wall near said front end.

7. The invention of claim 1 wherein the mannikin has: an upstanding rear wall thereacross at the rear end of the ridge; an upstanding front wall thereacross at the front end of the ridge; and a longitudinal center line indicia on each of said walls near said ends of the ridge.

8. The invention of claim 7 wherein said front wall is located rearwardly of the eye zone of the mannikin, and said rear wall is located at the ear zone thereof.

9. The invention of claim 1 wherein a fastening plate is disposed under said ridge.

* * * * *